US012657526B2

(12) United States Patent  
Goto et al.

(10) Patent No.: US 12,657,526 B2  
(45) Date of Patent: Jun. 16, 2026

(54) ANNOTATION SCHEDULING WITH GROUND TRUTH CONSISTENCY

(71) Applicant: INTERNATIONAL BUSINESS MACHINES CORPORATION, Armonk, NY (US)

(72) Inventors: Takuya Goto, Kodaira (JP); Shunsuke Ishikawa, Shinjuku-ku (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 17/655,187

(22) Filed: Mar. 17, 2022

(65) Prior Publication Data

US 2023/0297894 A1 Sep. 21, 2023

(51) Int. Cl.

| | |
|---|---|
| *G06F 16/00* | (2019.01) |
| *G06F 18/211* | (2023.01) |
| *G06F 18/214* | (2023.01) |
| *G06N 20/20* | (2019.01) |

(52) U.S. Cl.  
CPC ........... *G06N 20/20* (2019.01); *G06F 18/211* (2023.01); *G06F 18/214* (2023.01)

(58) Field of Classification Search  
CPC ...... G06F 16/86; G06F 16/258; G06F 16/254; G06F 16/214  
See application file for complete search history.

(56) References Cited

U.S. PATENT DOCUMENTS

| | | | | |
|---|---|---|---|---|
| 9,928,278 | B2 * | 3/2018 | Welinder | ................ G06F 16/14 |
| 11,443,102 | B1 * | 9/2022 | Wilson | .................. G06Q 30/04 |

| | | | | |
|---|---|---|---|---|
| 11,449,788 | B2 * | 9/2022 | Perona | .................... G06F 16/48 |
| 11,676,701 | B2 * | 6/2023 | Carter | .................... G16H 30/40 |
| | | | | 705/2 |
| 11,971,955 | B1 * | 4/2024 | Chakraborty | ....... G06F 3/04845 |
| 2003/0138758 | A1 * | 7/2003 | Burstein | ................ G09B 11/00 |
| | | | | 434/167 |

(Continued)

FOREIGN PATENT DOCUMENTS

| | | | | |
|---|---|---|---|---|
| CN | 112603361 | A * | 4/2021 | ........... G06V 10/454 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Noosha Arjomandi  
(74) *Attorney, Agent, or Firm* — Scott Dobson

(57) ABSTRACT

A method, system, and computer program product for automated annotation scheduling for ground truth consistency are provided. The method receives data to be annotated by one or more annotators of a set of annotators. The data is passed to a student model to generate a student model output. The data is passed to a teacher model to generate a teacher model output. An annotation trend estimation model analyzes the student model output and the teacher model output to determine output characteristics of the student model. The method selects an annotator of the set of annotators as a designated annotator for at least a portion of the data based on the output characteristics of the student model.

9 Claims, 8 Drawing Sheets

(56)                References Cited

U.S. PATENT DOCUMENTS

| | | | | |
|---|---|---|---|---|
| 2010/0291528 A1* | 11/2010 | Huerta | G09B 7/00 434/362 | |
| 2012/0166180 A1* | 6/2012 | Au | G06F 40/237 704/9 | |
| 2013/0097164 A1* | 4/2013 | Welinder | G06F 16/951 707/736 | |
| 2013/0346409 A1* | 12/2013 | Welinder | G06F 18/2185 707/737 | |
| 2016/0275417 A1 | 9/2016 | Welinder | | |
| 2019/0034831 A1* | 1/2019 | Perona | G06F 16/48 | |
| 2019/0205703 A1 | 7/2019 | Duesterwald | | |
| 2019/0311641 A1* | 10/2019 | Plant | G09B 5/08 | |
| 2020/0034702 A1* | 1/2020 | Fukuda | G06N 3/08 | |
| 2020/0160979 A1* | 5/2020 | Lyman | G06Q 10/06315 | |
| 2020/0211692 A1* | 7/2020 | Kalafut | G16H 50/20 | |
| 2020/0334538 A1* | 10/2020 | Meng | G10L 15/063 | |
| 2021/0407090 A1* | 12/2021 | Li | G06V 10/25 | |
| 2022/0012518 A1* | 1/2022 | Sutherland | G06F 18/2148 | |
| 2022/0027666 A1* | 1/2022 | Murugaraj | G06V 10/25 | |
| 2022/0101184 A1* | 3/2022 | Asif | G06N 3/082 | |
| 2022/0237504 A1* | 7/2022 | Zhang | G06N 3/045 | |
| 2022/0262100 A1* | 8/2022 | Chandler | G06T 19/00 | |
| 2023/0033364 A1* | 2/2023 | Khullar | G06N 3/044 | |
| 2023/0049167 A1* | 2/2023 | Wilson | G06V 30/19107 | |
| 2023/0078218 A1* | 3/2023 | Wang | G06N 3/098 706/12 | |
| 2023/0343438 A1* | 10/2023 | Zheng | G06F 40/169 | |
| 2023/0351243 A1* | 11/2023 | Xia | G06N 3/045 | |
| 2024/0095435 A1* | 3/2024 | Zhang | G06F 30/398 | |
| 2024/0296335 A1* | 9/2024 | Jandial | G06N 3/096 | |
| 2024/0386202 A1* | 11/2024 | Hoffman | G06F 40/30 | |
| 2025/0190824 A1* | 6/2025 | Fisher | G06N 20/20 | |

OTHER PUBLICATIONS

Nguyen et al., "SELF: Learning to Filter Noisy Labels with Self-Ensembling," ICLR, 2020, 16 pages.
Tarvainen, et al., "Mean teachers are better role models: Weight-averaged consistency targets improve semi-supervised deep learning results," arXiv:1703.01780v6, Apr. 16, 2018, 16 pages.

* cited by examiner

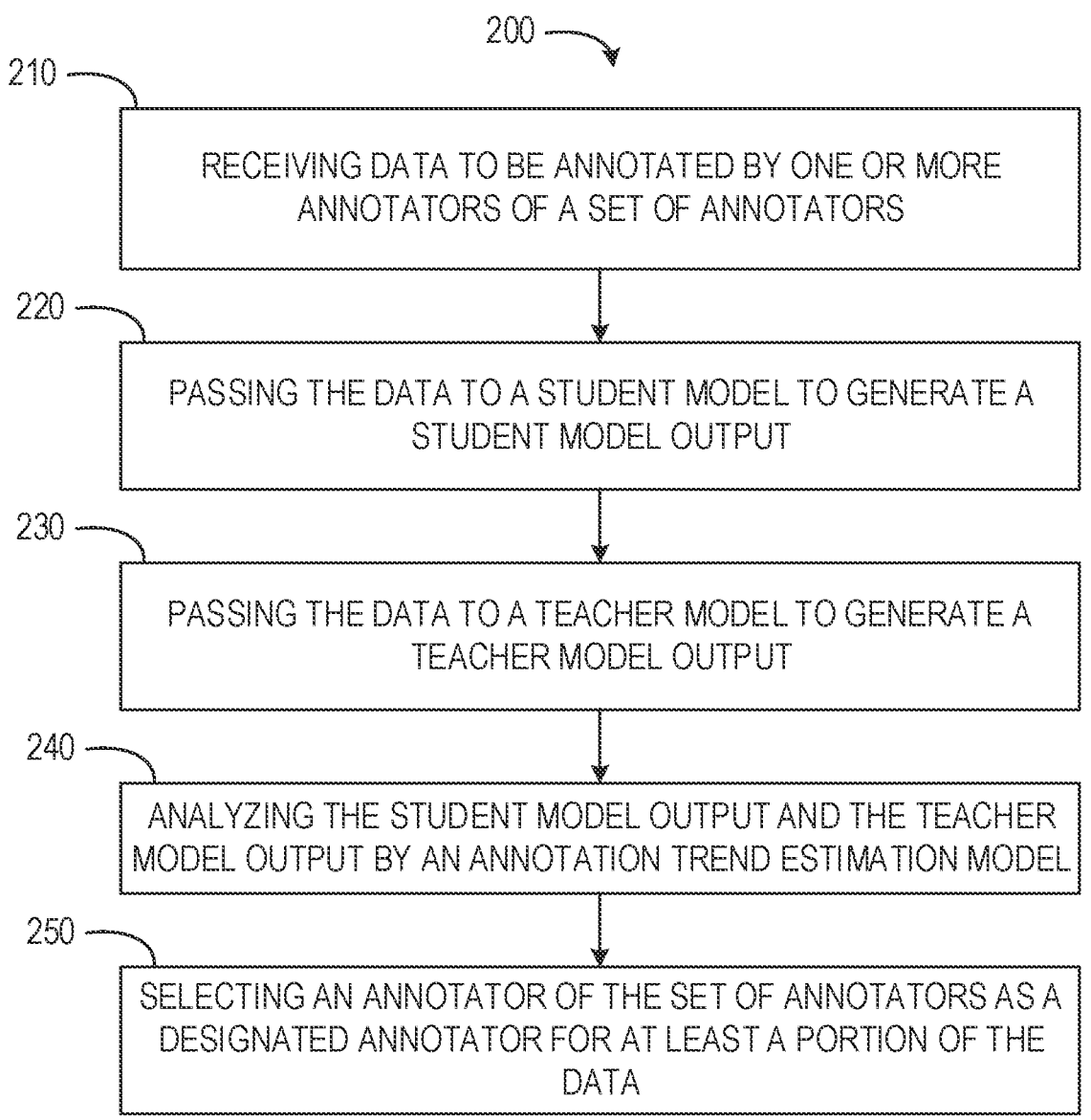

200

210

RECEIVING DATA TO BE ANNOTATED BY ONE OR MORE ANNOTATORS OF A SET OF ANNOTATORS

220

PASSING THE DATA TO A STUDENT MODEL TO GENERATE A STUDENT MODEL OUTPUT

230

PASSING THE DATA TO A TEACHER MODEL TO GENERATE A TEACHER MODEL OUTPUT

240

ANALYZING THE STUDENT MODEL OUTPUT AND THE TEACHER MODEL OUTPUT BY AN ANNOTATION TREND ESTIMATION MODEL

250

SELECTING AN ANNOTATOR OF THE SET OF ANNOTATORS AS A DESIGNATED ANNOTATOR FOR AT LEAST A PORTION OF THE DATA

PROCESS LOOP FOR EACH INPUT DATA OF A GROUP

420 —

ENTER INPUT DATA TO STUDENT MODELS, A TEACHER MODEL, AND AN ANNOTATION TREND ESTIMATION MODEL TO OBTAIN OUTPUT ERRORS AND KL DIVERGENCE

430 — A FIRST ANNOTATOR SATISFIES A NOISE CONDITION

YES

440 —

ALLOCATE DATA TO AN ANNOTATOR WITH A LOWEST ESTIMATED KL DIVERGENCE

NO

450 —

PROCEED TO A NEXT INPUT DATA

500

510 — PROCESS LOOP FOR EACH GROUP HAVING N PIECES OF INPUT DATA

520 — M > Δ M

NO

YES

530 — REALLOCATING INPUT DATA OF GROUP M - Δ M TO EACH ANNOTATOR

540 — ALLOCATING INPUT DATA OF A GROUP M TO EACH ANNOTATOR

550 — EXECUTING ANNOTATION TASK

560 — LEARNING WITH STUDENT MODELS AND A TEACHER MODEL

570 — LEARNING WITH AN ANNOTATION TREND ESTIMATION MODEL

580 — PROCEED TO A NEXT INPUT DATA GROUP

ANNOTATION SCHEDULING WITH GROUND TRUTH CONSISTENCY

BACKGROUND

Machine learning processes require large amounts of learning data. Supervised machine learning methods use learning data associated with ground truth labels. The ground truth labels represent an expected output from a machine learning model supplied with the learning data as an input. Labeled machine learning data is often manually prepared by human annotators. Providing ground truth labels to learning data is often referred to as an annotation task.

SUMMARY

According to an embodiment described herein, a computer-implemented method for automated annotation scheduling for ground truth consistency is provided. The method receives data to be annotated by one or more annotators of a set of annotators. The data is passed to a student model to generate a student model output. The data is passed to a teacher model to generate a teacher model output. An annotation trend estimation model analyzes the student model output and the teacher model output to determine output characteristics of the student model. The method selects an annotator of the set of annotators as a designated annotator for at least a portion of the data based on the output characteristics of the student model.

According to an embodiment described herein, a system for automated annotation scheduling for ground truth consistency is provided. The system includes one or more processors and a computer-readable storage medium, coupled to the one or more processors, storing program instructions that, when executed by the one or more processors, cause the one or more processors to perform operations. The operations receive data to be annotated by one or more annotators of a set of annotators. The data is passed to a student model to generate a student model output. The data is passed to a teacher model to generate a teacher model output. An annotation trend estimation model analyzes the student model output and the teacher model output to determine output characteristics of the student model. The operations select an annotator of the set of annotators as a designated annotator for at least a portion of the data based on the output characteristics of the student model.

According to an embodiment described herein, a computer program product for automated annotation scheduling for ground truth consistency is provided. The computer program product includes a computer-readable storage medium having program instructions embodied therewith, the program instructions being executable by one or more processors to cause the one or more processors to receive data to be annotated by one or more annotators of a set of annotators. The data is passed to a student model to generate a student model output. The data is passed to a teacher model to generate a teacher model output. An annotation trend estimation model analyzes the student model output and the teacher model output to determine output characteristics of the student model. The computer program product selects an annotator of the set of annotators as a designated annotator for at least a portion of the data based on the output characteristics of the student model.

BRIEF DESCRIPTION OF THE DRAWINGS

FIG. 2 depicts a flow diagram of a computer-implemented method for automated annotation scheduling for ground truth consistency, according to at least one embodiment.

DETAILED DESCRIPTION

Figure 1:
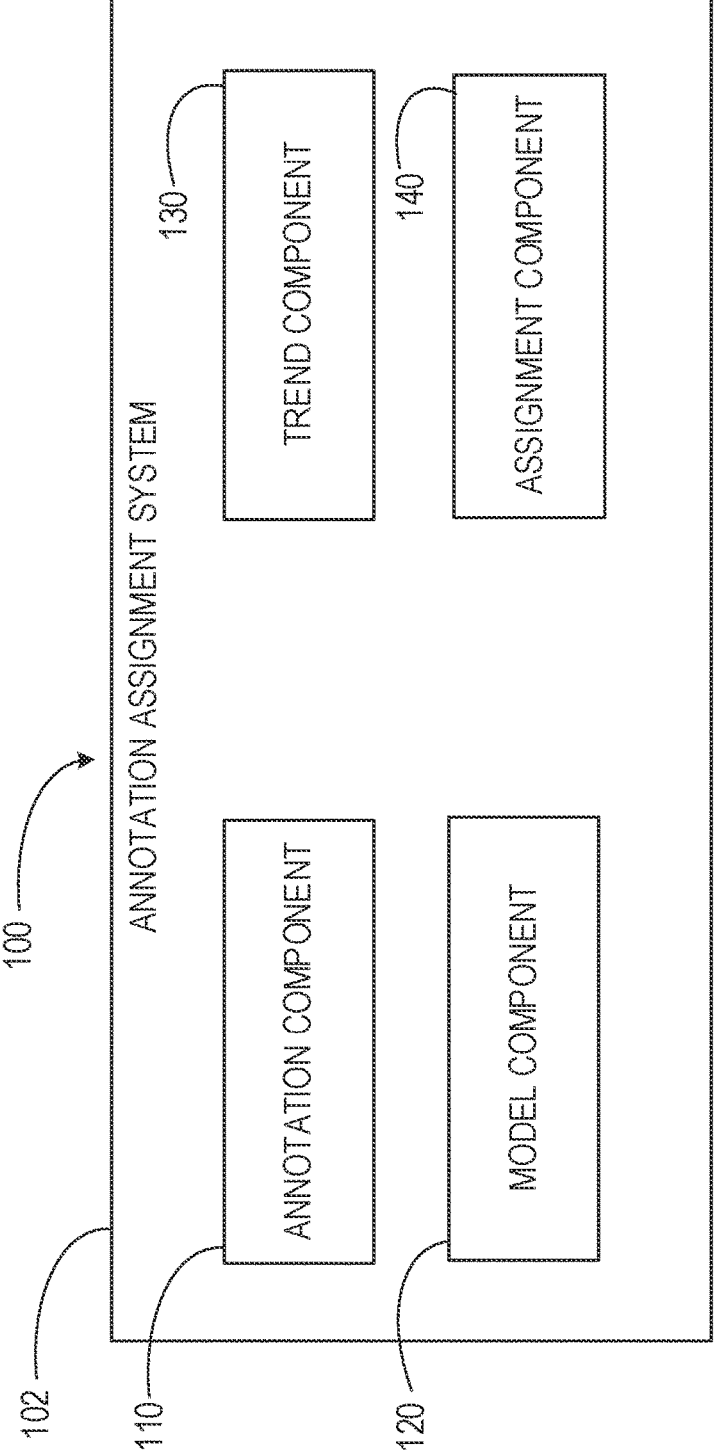
FIG. 1 depicts a block diagram of a computing environment for implementing concepts and computer-based methods, according to at least one embodiment.

The present disclosure relates generally to methods for annotation task distribution. More particularly, but not exclusively, embodiments of the present disclosure relate to a computer-implemented method for automated annotation scheduling for ground truth consistency. The present disclosure relates further to a related system for annotation task distribution, and a computer program product for operating such a system.

Machine learning processes require large amounts of learning data. Supervised machine learning methods use learning data associated with ground truth labels. Ground truth labels may include class labels indicating a class classification data, entity type labels and position labels in named entity recognition data, and area annotation labels in image segmentation data. The ground truth labels represent an expected output from a machine learning model supplied with the learning data as an input. Labeled machine learning data is often manually prepared by human annotators. Providing ground truth labels to learning data is often referred to as an annotation task.

Supervised machine learning methods may be used to optimize parameters of machine learning models. Such supervised machine learning methods may be used to reduce error or predicted error of machine learning model output given suitable input data. When differing ground truths are given to input data having a same or similar characteristic, supervised machine learning models may not suitably converge. Where the learning does not converge, a given machine learning model may have low accuracy of output. Providing the same ground truth to input data for the same characteristic is understood as consistency of learning data/ground truth and represents an important aspect of learning data annotation tasks.

Annotation tasks function on human operations for large amounts of input data. Securing or maintaining consistency of learning data across large data sets with multiple annotators present difficulties in current implementations of supervised machine learning. Such present machine learning implementations often rely on a plurality of annotators performing annotation tasks on the same input data. The plurality of annotators may discuss and come to a consensus to determine a final ground truth for the learning data to secure consistency. Such methods duplicate operations and annotation tasks. Further such methods may incorporate errors and difficulties in reaching ground truth by consensus. As such, current supervised machine learning methods present a need to enable consistency in ground truth through automated and intelligent distribution of annotation tasks.

Embodiments of the present disclosure automatically schedule annotation tasks distributed across a plurality of annotators. Embodiments of the present disclosure enable securing consistency of learning data and ground truth by analyzing annotation tendencies and trends of annotators. Some embodiments of the present disclosure estimate past annotation trends of annotators. Some embodiments of the present disclosure use past annotation trends of annotators to automatically allocate annotation tasks to an annotator based on estimated consistency of learning data without duplication or additional operations. Embodiments of the present disclosure enable verification of learning data consistency of past annotation data and automatically reallocate annotation tasks of learning data with impaired consistency.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an annotation assignment system 102. The annotation assignment system 102 may comprise an annotation component 110, a model component 120, a trend component 130, and an assignment component 140. The annotation component 110 receives data to be annotated by a set of annotators. The model component 120 trains student, teacher, and annotation trend estimation models and passes data to trained student and teacher models. The trend component 130 analyzes student model output and teacher model output with annotation trend estimation models. The assignment component 140 selects one or more annotators of a set of annotators for annotation tasks. Although described with distinct components, it should be understood that, in at least some embodiments, components may be combined or divided, and/or additional components may be added without departing from the scope of the present disclosure.

Referring now to FIG. 2, a flow diagram of a computer-implemented method 200 is shown. The computer-implemented method 200 is a method for automated annotation scheduling for ground truth consistency. In some embodiments, the computer-implemented method 200 may be performed by one or more components of the computing environment 100, as described in more detail below.

At operation 210, the annotation component 110 receives data to be annotated by one or more annotators. The one or more annotators may be part of a set of annotators. The set of annotators may be a plurality of annotators. The data to be annotated may be a new data set. The new data set may not be annotated. In some instances, the data to be annotated is a subset of unannotated data or one or more groups of unannotated data among a larger set of data currently being annotated or subject to annotation tasks. The subset of unannotated data or groups of unannotated data may be data to be reallocated for annotation tasks among the set of annotators. This may enable periodic verification of learning data consistency and automatically allocating annotation data based on historical data annotations. In some instances, the data to be annotated is a set of previously annotated data. The previously annotated data may be a subject of concern based on lack of ground truth consistency within the previously annotated data. The previously annotated data may also be subject to review based on behavior of the previously annotated data when the data is applied to a machine learning model.

The data to be annotated may be any suitable data for machine learning processes. For example, the data to be annotated may include image data, file data, audio data or any other suitable data type. The data to be annotated may include one or more characteristics or types. In some instances, the data to be annotated may be associated with a single characteristic or type, such that the data may be labeled with a common ground truth. In some embodiments, the data to be annotated may be divided into a plurality of data groups. Each data group may share a characteristic, type, or other aspect capable of applying a ground truth label to the group.

At operation 220, the model component 120 passes the data to a student model. The student model may be configured to generate a student model output. The student model may be generated to learn a data set, data characteristic, or data type similar to or the same as the data to be annotated. In some instances, the student model is trained on or generated using annotated data having a same characteristic, type, or ground truth as the data to be annotated. The annotated data used to train or generate the student model may be obtained from one or more human annotators. Once the data to be annotated is passed to the student model, the student model may generate an output identifying a modeled ground truth or a set of modeled ground truths for the data.

The student model may be a model among a plurality of student models. In some embodiments, each student model of the plurality of student models is trained based on historical annotation data of an annotator or historical data annotated by the annotator. In such embodiments, the model component 120 trains each student model of the plurality of student models with annotated data to generate a student model for each annotator of the set of annotators using data that had previously been annotated by a given annotator.

In some embodiments, the student model is included in the plurality of student models. Each student model of the plurality of student models may be associated with an annotator of the set of annotators. The model component 120 may pass the data to a set of student models. The set of student models may include all of the student models of the plurality of student models or a portion thereof. In this way, the model component 120 may pass the data to a student model associated with each annotator being considered for annotation tasks associated with the data to be annotated.

At operation 230, the model component 120 passes the data to a teacher model. The teacher model may be configured to generate a teacher model output. The teacher model may be a model trained on annotated data having ground truth labels representing a consensus from the set of annotators or another set of annotators. In some embodiments, the teacher model is a model ensemble composed from a set or plurality of student models.

In some embodiments, the student and teacher models are used in model ensembling. In some instances, the model ensembling is performed with a mean teacher model. In such embodiments, the model component uses a set of student models. Parameters of the set of student models are averaged to create a teacher model. The teacher model may serve as a final learning model.

In some embodiments, the model component 120 randomly divides input data into groups having a variable n pieces of data. Each group of data is annotated and an annotation task is completed for each group of data. The model component 120 then uses the annotated learning data as a whole or in a group to learn with the student models and the teacher model. The student models and the teacher models may be learned or generated prior to initiation of operation 210.

At operation 240, the trend component 130 analyzes the student model output and the teacher model output. In some embodiments, the student model output and the teacher model output are analyzed by an annotation trend estimation model. The annotation trend estimation model may determine output characteristics of the student model.

The annotation trend estimation model may be trained with all annotated learning data used to train or learn the student model or student models and the teacher model. The annotation trend estimation model may predict output characteristics of student models of each annotator. In some embodiments, the annotation trend estimation model determines the output characteristics of the student model as including output error and Kullback-Leibler (KL) divergence. In some instances, the output error is identified using a loss function. The KL divergence of outputs may be determined from the student models and the teacher model. For example, the annotation trend estimation model may predict the KL divergence for the data to be annotated between a student model and a teacher model. Where a set or plurality of student models are used, the annotation trend estimation model may predict KL divergence values for each student model and teacher model pair of the set or plurality of student models.

In some embodiments, the annotation trend estimation model is one of a set of annotation trend estimation models. In such embodiments, the model component 120 may train the set of annotation trend estimation models using a set of annotated data. the set of annotated data may include data annotated by each annotator of the set of annotators. Each annotator trend estimation model may be associated with an annotator of the set of annotators. In such embodiments, the trend component 130 analyzes each student model output or a plurality of student model outputs using an annotation trend estimation model associated with an annotator for that student model.

At operation 250, the assignment component 140 selects an annotator of the set of annotators as a designated annotator for at least a portion of the data. In some embodiments, the assignment component 140 selects the designated annotator based on the output characteristics of the student model. By estimating past annotation trends of annotators, data can be automatically allocated to an annotator, by the assignment component 140, considered to be able to keep ground truth consistency of machine learning data without requiring duplicate or additional operations.

The assignment component 140 may select the annotator using the output characteristics of the student model and a stop condition. In some instances, the stop condition may be associated with a ground truth noise. Ground truth noise in annotated data may occur where ground truth labels within a data set impairs consistency of learning data used in models or impairs model functioning. For example, the stop condition may be a noise threshold. The noise threshold may be associated with input error and KL divergence. In such instances, data having an input error beyond a range of a specified percentile in past learning errors and having a KL divergence of outputs from plural models beyond a specified value may be determined to be noisy ground truth. Thus, annotated data having ground truth noise above the noise threshold may be unsuitable and contain inaccurate ground truth labels. Such a ground truth noise level may indicate an annotator is not suited to performing annotation for one or more types or characteristics of data to be annotated. Annotated data having ground truth noise below the noise threshold may be suitable for use in machine learning models and include accurate ground truth labels. Such a ground truth noise level may indicate an annotator is acceptably performing annotation tasks for one or more types or characteristics of data to be annotated.

Figure 3:
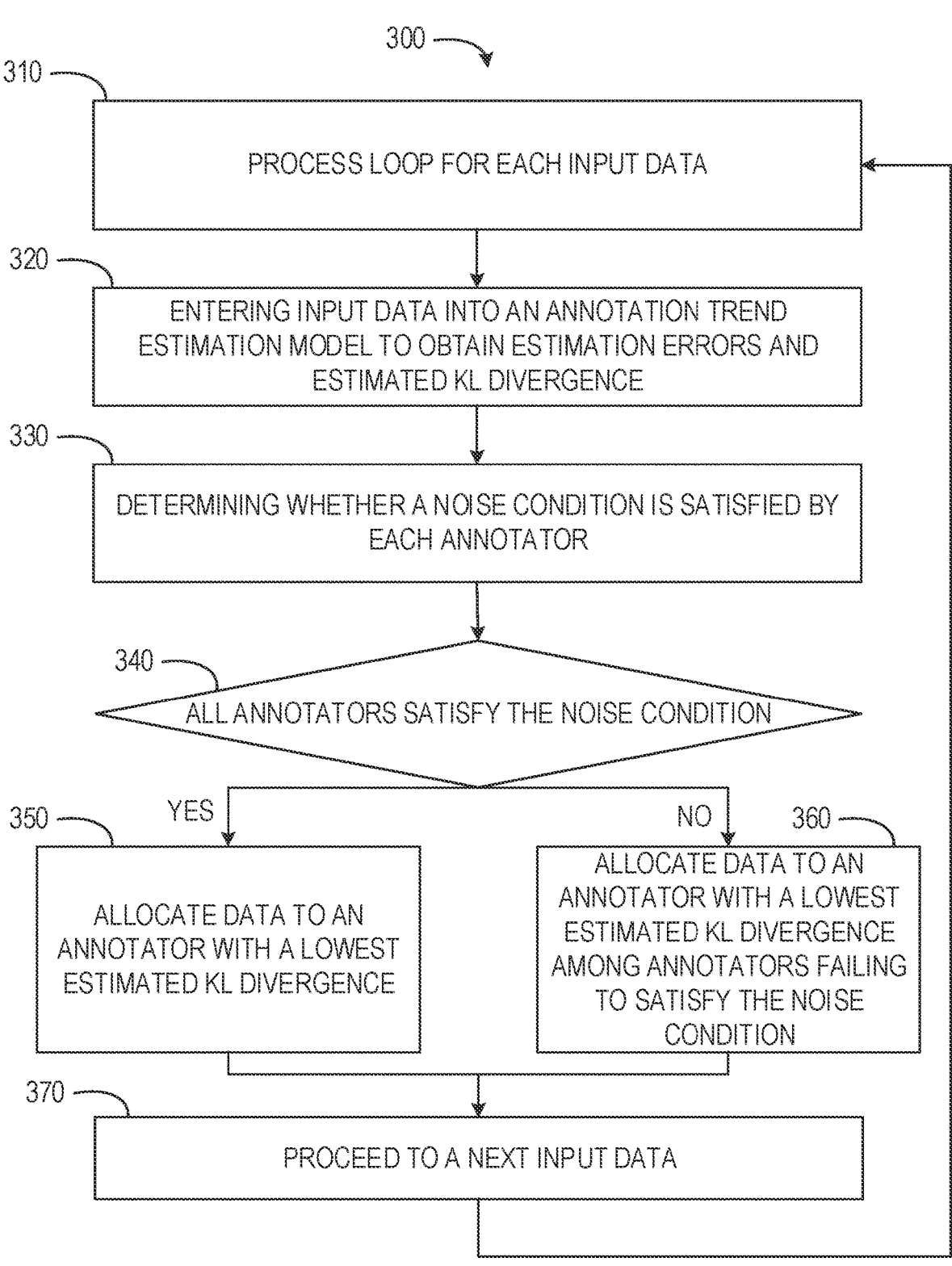
FIG. 3 depicts a flow diagram of a computer-implemented method for assigning annotators during annotation scheduling of FIG. 2, according to at least one embodiment.

In some embodiments, the data to be annotated is a new set of machine learning data. In such embodiments, the assignment component 140 selects the designated annotator while in a process loop established for assigning each input data element as in operation 310 of FIG. 3. The assignment component 140 may select the designated annotator after the trend component 130 enters the input data into the annotation trend estimation model to obtain estimation errors and estimated KL divergence as in operation 320. The assignment component 140 may select the designated annotator based on the output characteristics of the student model by determining a ground truth noise for each annotator of the set of annotators and comparing the ground truth noise to a noise threshold. The determination may indicate whether a noise condition is satisfied by each annotator, as in operation 330. The assignment component 140 determines a subset of annotators having a ground truth noise below a noise threshold. The assignment component 140 may then select the designated annotator from the subset of annotators. In some instances, the assignment component 140 selects an annotator with a lowest KL divergence as the designated annotator.

As in operation 340, the assignment component 140 may determine all of the annotators have a ground truth noise below the noise threshold. As in operation 350, where all of the annotators of the set of annotators have a ground truth noise below the noise threshold, the assignment component 140 may select the designated annotator from among the whole set of annotators. The assignment component 140 may select the designated annotator as an annotator with a lowest KL divergence score from among the entire set of annotators.

In some embodiments, the assignment component 140 selects the designated annotator based on the output characteristics of the student model by determining a ground truth noise for each annotator of the set of annotators. As in operation 340, the assignment component 140 may determine each annotator of the set of annotators are associated with a ground truth noise above the noise threshold. In such embodiments, the assignment component 140 selects the designated annotator as an annotator with a lowest KL divergence among annotators failing to fall below the noise threshold, as in operation 360. Once an input data element has been assigned, the assignment component 140 may proceed to a next input data element, as in operation 370. In some instances, moving to operation 370 repeats or iterates the process loop.

Figure 4:
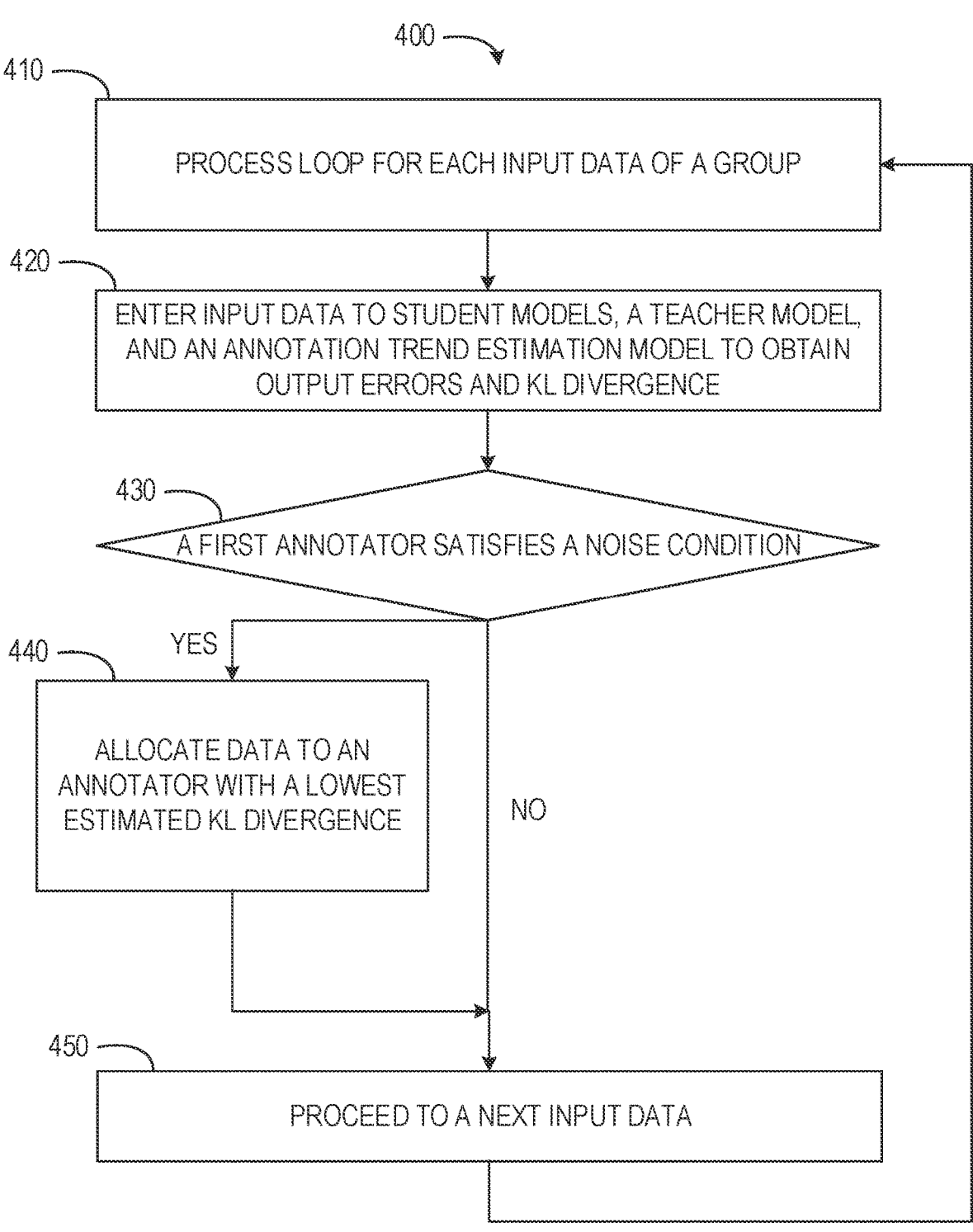
FIG. 4 depicts a flow diagram of a computer-implemented method for assigning annotators during annotation scheduling of FIG. 2, according to at least one embodiment.

In some embodiments, the data to be annotated is a data set which was previously annotated (e.g., previously annotated data) by a first annotator associated with a first KL divergence. As shown in FIG. 4, the previously annotated data may be assigned for reallocation. The reallocation may be for groups of data. The groups of data may be an entire data set or a portion of a data set. In such instances, all or a portion of the data set may include groups of previously annotated data, while some of the data set may include groups of data to be allocated. The assignment component 140 may select the designated annotator based on the output characteristics of the student model by determining a ground truth noise for each annotator of the set of annotators. The selection of the designated annotator may be performed in a process loop for each input data of a specified group of data, as shown in operation 410. Data from a reallocation group may be passed to student models, a teacher model, and the annotation trend estimation model, as in operation 420 and outlined above. The assignment component 140 may determine a ground truth noise for each annotator of the set of annotators and compare the ground truth noise to a noise threshold. The determination may indicate whether a noise condition is satisfied by a first annotator associated with the previously annotated data, as in operation 430. The assignment component 140 may determine the set of annotators, including the first annotator, are associated with a ground truth noise above a noise threshold. Where the first annotator is associated with a ground truth noise above the noise threshold, the assignment component 140 may select the designated annotator as a second annotator associated with a second KL divergence, as in operation 440. The second annotator may have a second KL divergence lower than the first KL divergence. In some instances, the second annotator is selected regardless of being associated with a ground truth noise above the noise threshold. In some instances, where the first annotator, associated with the previously annotated data, has a ground truth noise below the noise threshold, the first annotator may be selected as the second or designated annotator. Once the designated annotator is selected, in operation 450, the process loop may proceed to assigning a next input data of the reallocation group.

In some instances, the first annotator is associated with a ground truth noise below the noise threshold. In such instances, the data to be annotated (e.g., a group of data to be reassigned) may be placed back into a process loop. In some instances, once placed back into the processing loop, the data to be annotated is reassigned or maintained with the first annotator.

Figure 5:
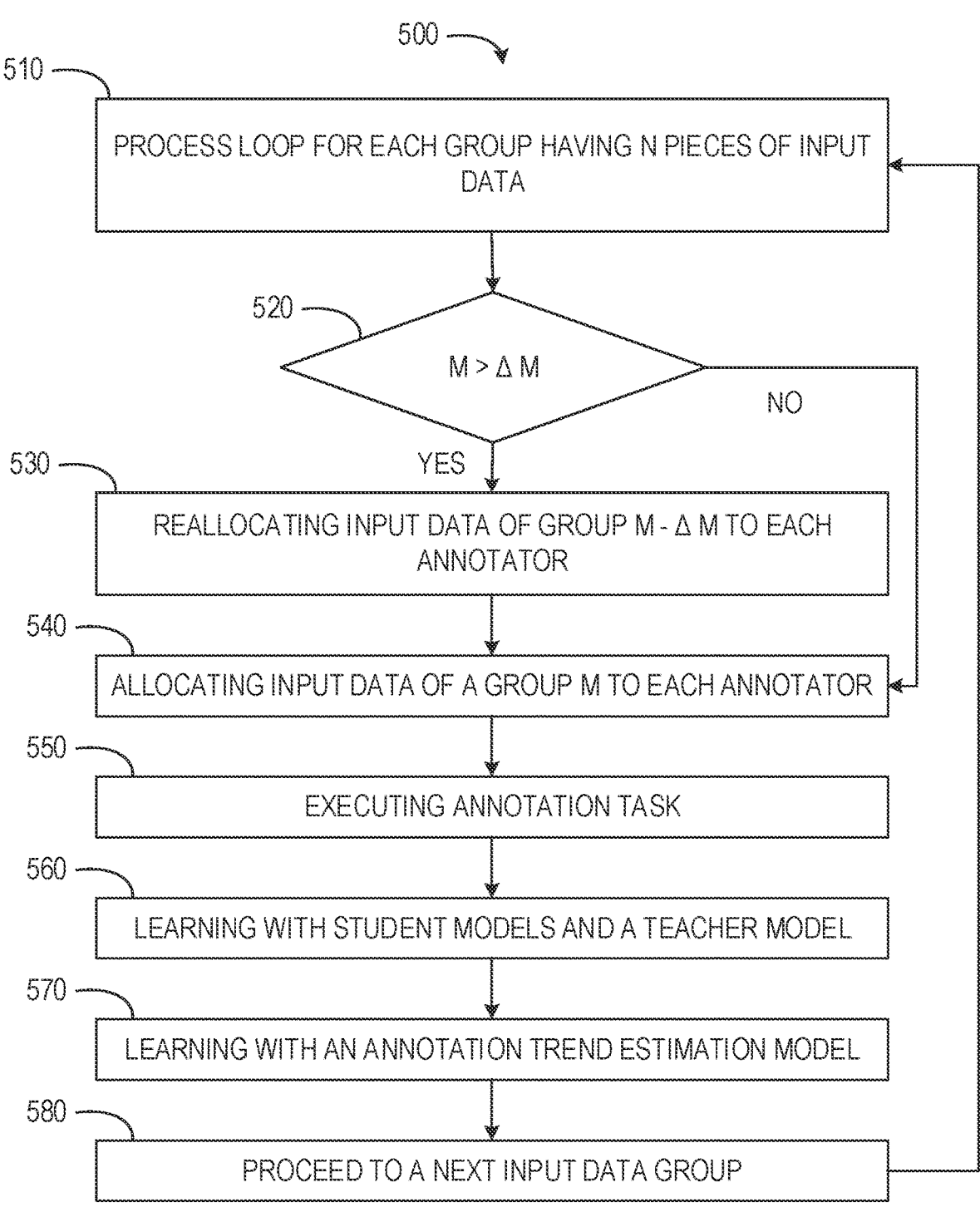
FIG. 5 depicts a flow diagram of a computer-implemented method for automated annotation scheduling for ground truth consistency, according to at least one embodiment.

FIG. 5 shows a flow diagram of an embodiment of a computer-implemented method 500 for automated annotation scheduling for ground truth consistency. The method 500 may be performed by or within the computing environment 100. In some embodiments, the method 500 comprises or incorporates one or more operations of the method 200. In some instances, operations of the method 500 may be incorporated as part of or sub-operations of the method 200.

In operation 510, the annotation assignment system 102 enters into a process loop for assigning groups of machine learning data. Each group may have n pieces of input data. In operation 520, the assignment component 140 determines whether a group or piece of input data should be reassigned. In some instances, the value ΔM is an interval to re-evaluate groups annotated in the past. Where a value of M is greater than a value of ΔM, the annotation assignment system 102 proceeds to operation 530 to reallocate input data of a group M−ΔM to each annotator of a set of annotators. Where a value of M is less than or equal to ΔM, the annotation assignment system 102 proceeds to operation 540 to allocate input data of a group M to each annotator. Once allocated, operation 550 is performed, executing annotation tasks. The annotation tasks may be executed by individual annotators assigning ground truth labels to assigned input data. Once the annotation tasks have been executed and received by the annotation assignment system 102, the model component 120 performs model learning for a student model for each annotator and a teacher model using model ensemble operations, described above. Once the student models and teacher model have been trained by the model component 120, the model component may train the annotation trend estimation model to interpret model output of the student models in light of the teacher model. In such instances, the annotation trend estimation model may identify error trends of annotators based on output errors and KL divergence determined from output of the student models compared to output of the teacher model. Once the annotation trend estimation model is trained, the annotation assignment system 102 may proceed to operation 580 to a next input data group. The operations of method 500 may be incorporated with the operations of method 200 to assign or reassign data to be annotated to different annotators of the set of annotators and to continuously or iteratively train the student models, the teacher model, and the annotation trend estimation model.

Figure 6:
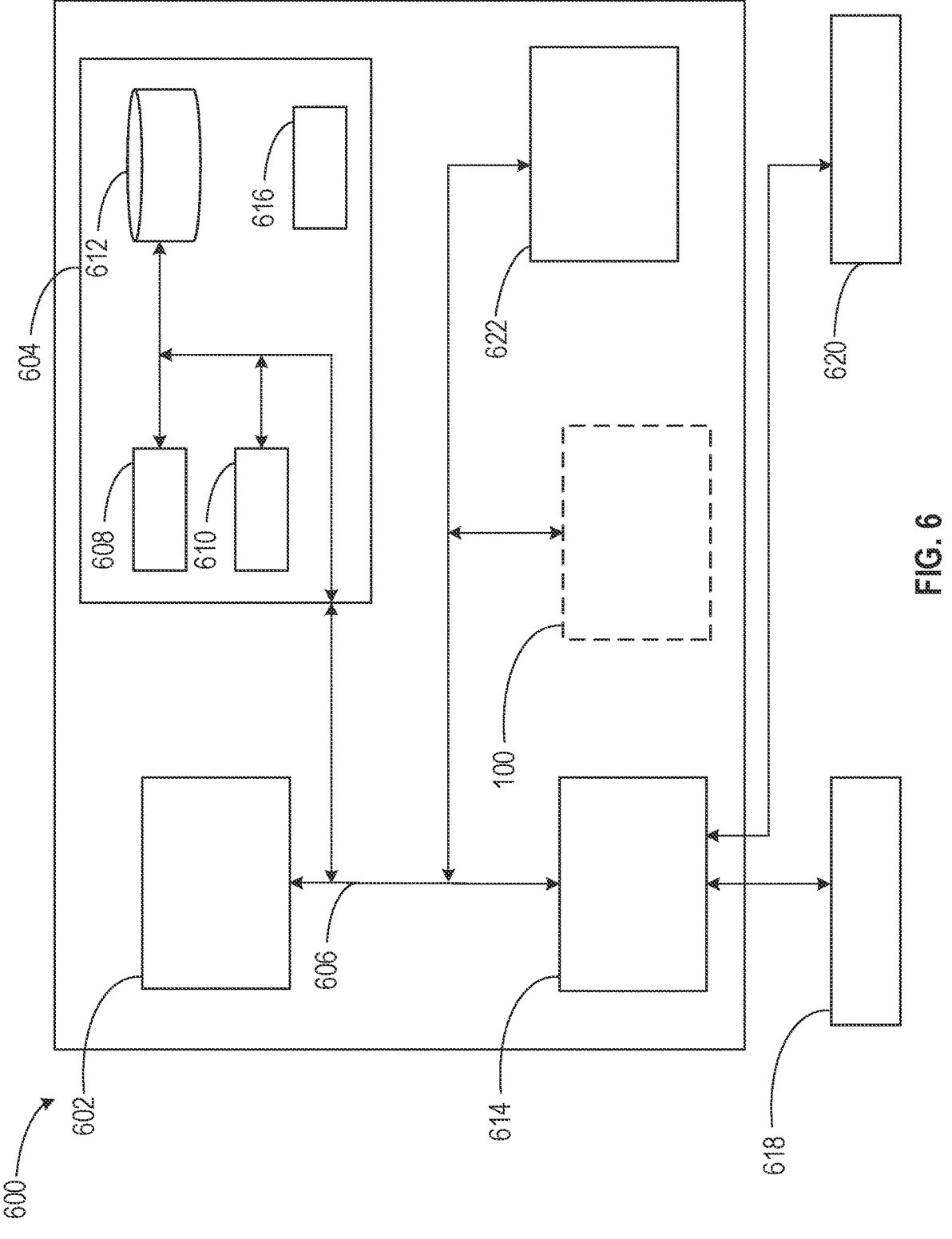
FIG. 6 depicts a block diagram of a computing system for automated annotation scheduling for ground truth consistency, according to at least one embodiment.

Embodiments of the present disclosure may be implemented together with virtually any type of computer, regardless of the platform is suitable for storing and/or executing program code. FIG. 6 shows, as an example, a computing system 600 (e.g., cloud computing system) suitable for executing program code related to the methods disclosed herein and for automated annotation scheduling for ground truth consistency.

The computing system 600 is only one example of a suitable computer system and is not intended to suggest any limitation as to the scope of use or functionality of embodiments of the present disclosure described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors 602 (e.g., processing units), a system memory 604 (e.g., a computer-readable storage medium coupled to the one or more processors), and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, the system memory 604 may include at least one program product having a set (e.g., at least one) of program modules that are configured to carry out the functions of embodiments of the present disclosure.

The program/utility, having a set (at least one) of program modules 616, may be stored in the system memory 604 by way of example, and not limiting, as well as an operating system, one or more application programs, other program modules, and program data. Program modules may include one or more of the annotation component 110, the model component 120, the trend component 130, and the assignment component 140, which are illustrated in FIG. 1. Each of the operating systems, one or more application programs, other program modules, and program data or some combination thereof, may include an implementation of a networking environment. Program modules 616 generally carry out the functions and/or methodologies of embodiments of the present disclosure, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 7:
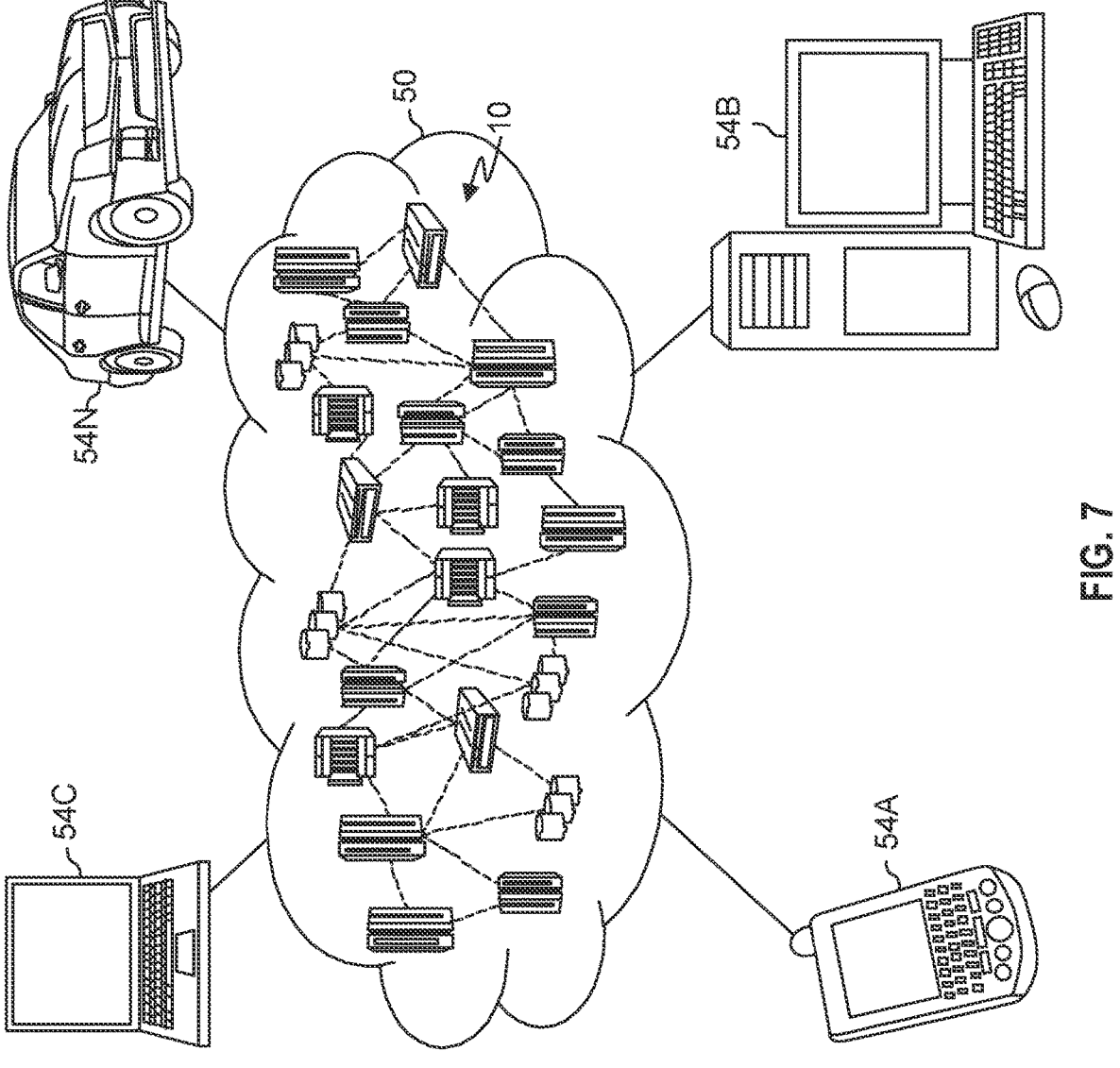
FIG. 7 is a schematic diagram of a cloud computing environment in which concepts of the present disclosure may be implemented, in accordance with an embodiment of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
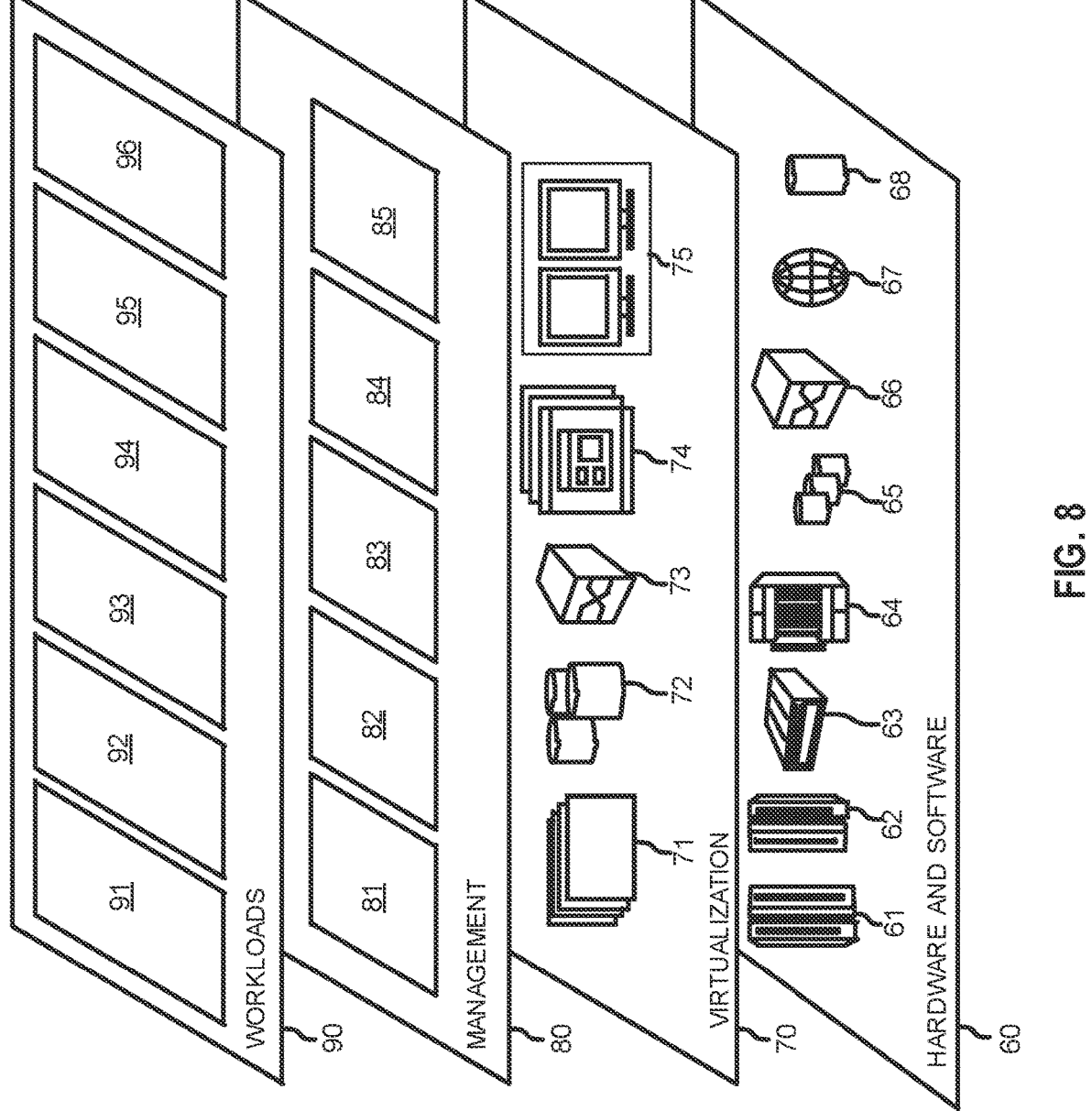
FIG. 8 is a diagram of model layers of a cloud computing environment in which concepts of the present disclosure may be implemented, in accordance with an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and annotation assignment processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving data to be annotated by one or more annotators of a set of annotators;
   passing the data to a student model to generate a student model output;
   passing the data to a teacher model to generate a teacher model output;
   analyzing the student model output and the teacher model output by an annotation trend estimation model to determine output characteristics of the student model, wherein the output characteristics of the student model include output error and Kullback-Leibler (KL) divergence; and
   selecting an annotator of the set of annotators as a designated annotator for at least a portion of the data based on the output characteristics of the student model, wherein selecting the designated annotator based on the output characteristics of the student model further comprises:
   determining a ground truth noise for each annotator of the set of annotators;
   determining the set of annotators are associated with a ground truth noise above a noise threshold; and
   selecting the designated annotator as an annotator with a lowest KL divergence.

2. The method of claim 1, wherein the student model is a model of a plurality of student models, the method further comprising:

training the plurality of student models with annotated data to generate a student model from each annotator of the set of annotators, the annotated data being historical data annotated by the set of annotators.

3. The method of claim 1, wherein the student model is a first model of a plurality of student models, each student model of the plurality of student models being associated with an annotator of the set of annotators, and passing the data to the student model further comprises:
   passing the data to the plurality of student models to generate a student model output for each annotator of the set of annotators.

4. A system, comprising:
   one or more processors; and
   a computer-readable storage medium, coupled to the one or more processors, storing program instructions that, when executed by the one or more processors, cause the one or more processors to perform operations comprising:
   receiving data to be annotated by one or more annotators of a set of annotators;
   passing the data to a student model to generate a student model output;
   passing the data to a teacher model to generate a teacher model output;
   analyzing the student model output and the teacher model output by an annotation trend estimation model to determine output characteristics of the student model, wherein the output characteristics of the student model include output error and Kullback-Leibler (KL) divergence; and
   selecting an annotator of the set of annotators as a designated annotator for at least a portion of the data based on the output characteristics of the student model, wherein selecting the designated annotator based on the output characteristics of the student model further comprises:
   determining a ground truth noise for each annotator of the set of annotators;
   determining the set of annotators are associated with a ground truth noise above a noise threshold; and
   selecting the designated annotator as an annotator with a lowest KL divergence.

5. The system of claim 4, wherein the student model is a model of a plurality of student models, the operations further comprising:
   training the plurality of student models with annotated data to generate a student model from each annotator of the set of annotators, the annotated data being historical data annotated by the set of annotators.

6. The system of claim 4, wherein the student model is a first model of a plurality of student models, each student model of the plurality of student models being associated with an annotator of the set of annotators, and passing the data to the student model further comprises:
   passing the data to the plurality of student models to generate a student model output for each annotator of the set of annotators.

7. A computer program product comprising a computer readable storage medium having program instructions embodied therewith, the program instructions being executable by one or more processors to cause the one or more processors to perform operations comprising:
   receiving data to be annotated by one or more annotators of a set of annotators;
   passing the data to a student model to generate a student model output;

passing the data to a teacher model to generate a teacher model output;

analyzing the student model output and the teacher model output by an annotation trend estimation model to determine output characteristics of the student model, wherein the output characteristics of the student model include output error and Kullback-Leibler (KL) divergence; and selecting an annotator of the set of annotators as a designated annotator for at least a portion of the data based on the output characteristics of the student model, wherein selecting the designated annotator based on the output characteristics of the student model further comprises:

determining a ground truth noise for each annotator of the set of annotators;

determining the set of annotators are associated with a ground truth noise above a noise threshold; and selecting the designated annotator as an annotator with a lowest KL divergence.

8. The computer program product of claim 7, wherein the student model is a model of a plurality of student models, the operations further comprising:

training the plurality of student models with annotated data to generate a student model from each annotator of the set of annotators, the annotated data being historical data annotated by the set of annotators.

9. The computer program product of claim 7, wherein the student model is a first model of a plurality of student models, each student model of the plurality of student models being associated with an annotator of the set of annotators, and passing the data to the student model further comprises:

passing the data to the plurality of student models to generate a student model output for each annotator of the set of annotators.

* * * * *